(12) United States Patent
Qian et al.

(10) Patent No.: US 10,885,288 B2
(45) Date of Patent: Jan. 5, 2021

(54) ELECTRONIC LABEL SYSTEM

(71) Applicant: Hamilton Sundstrand Corporation, Charlotte, NC (US)

(72) Inventors: Lee Qian, Rockford, IL (US); Joshua C. Swenson, Rockford, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/215,144

(22) Filed: Dec. 10, 2018

(65) Prior Publication Data

US 2020/0184163 A1 Jun. 11, 2020

(51) Int. Cl.
*G06K 7/08* (2006.01)
*G06K 7/10* (2006.01)

(52) U.S. Cl.
CPC .............................. *G06K 7/10366* (2013.01)

(58) Field of Classification Search
CPC ... G06K 7/00; G06K 17/0025; G06K 17/0029
USPC ....................... 235/451, 492, 462.46, 472.02
See application file for complete search history.

(56) References Cited

U.S. PATENT DOCUMENTS

| | | | | |
|---|---|---|---|---|
| 6,237,051 B1 * | 5/2001 | Collins | ............. | G06F 17/30241 702/84 |
| 7,050,894 B2 * | 5/2006 | Halm | ..................... | B64D 47/00 701/29.4 |
| 7,183,924 B1 * | 2/2007 | Ku | ....................... | G06Q 10/087 340/568.1 |
| 7,551,086 B2 * | 6/2009 | Coop | ..................... | G06Q 50/30 340/457.4 |
| 7,598,868 B2 | 10/2009 | Lee et al. | | |
| 7,620,484 B1 * | 11/2009 | Chen | ..................... | G06Q 20/102 701/31.5 |
| 7,983,809 B2 * | 7/2011 | Kell | ....................... | G06Q 10/06 340/438 |
| 8,130,081 B2 | 3/2012 | Ung et al. | | |
| 9,507,982 B2 | 11/2016 | Mylaraswamy et al. | | |
| 9,568,912 B2 | 2/2017 | Chippar et al. | | |
| 9,932,112 B1 | 4/2018 | Harms et al. | | |
| 10,108,823 B2 * | 10/2018 | Gauthier | .................. | H05K 7/14 |
| 10,489,991 B2 * | 11/2019 | Griffith | .................... | G06F 16/22 |
| 2002/0138184 A1 * | 9/2002 | Kipersztok | ........ | G05B 23/0278 701/32.9 |

(Continued)

FOREIGN PATENT DOCUMENTS

| CN | 202736096 U | 2/2013 |
|---|---|---|
| EP | 3048585 A1 | 7/2016 |

OTHER PUBLICATIONS

"Electronically Updateable Data Storage Device Requiring Minimal Power"; Research Disclosure; vol. 100; No. 10; Dec. 1, 2005; 1 Page.

(Continued)

*Primary Examiner* — Daniel St Cyr
(74) *Attorney, Agent, or Firm* — Cantor Colburn LLP

(57) ABSTRACT

An electronic label system is provided. The electronic label system includes a line replaceable unit. The electronic label system also includes an electronic label communicatively coupled to the line replaceable unit via a hardware link. The electronic label stores information respective to the line replaceable unit. The electronic label includes a chip or a radio frequency identification tag that provides the information to a reader.

16 Claims, 3 Drawing Sheets

(56) References Cited

U.S. PATENT DOCUMENTS

| | | | | |
|---|---|---|---|---|
| 2004/0203360 | A1* | 10/2004 | Yamagiwa | B62H 5/20 455/41.1 |
| 2004/0206810 | A1* | 10/2004 | Yamagiwa | G06Q 10/087 235/376 |
| 2004/0260597 | A1* | 12/2004 | Nishikawa | G06Q 10/06 705/7.13 |
| 2005/0035852 | A1* | 2/2005 | Paulsen | G07C 5/085 340/438 |
| 2005/0087593 | A1* | 4/2005 | Benedict | B60C 23/0493 235/375 |
| 2005/0088320 | A1* | 4/2005 | Kovach | G07C 5/085 340/933 |
| 2005/0108204 | A1* | 5/2005 | Gordon | G06F 17/30312 |
| 2006/0007003 | A1* | 1/2006 | Yamagiwa | B62H 5/20 340/572.1 |
| 2006/0091207 | A1* | 5/2006 | Chang | G06Q 10/087 235/385 |
| 2006/0144997 | A1* | 7/2006 | Schmidt | B64F 5/0045 244/100 R |
| 2006/0217993 | A1* | 9/2006 | Anderson | G06Q 10/10 701/29.3 |
| 2006/0255120 | A1* | 11/2006 | Schulz | G06Q 10/06 235/376 |
| 2007/0114280 | A1* | 5/2007 | Coop | G06Q 50/30 235/385 |
| 2007/0266782 | A1* | 11/2007 | Bartz | G06Q 10/087 73/156 |
| 2008/0082427 | A1* | 4/2008 | Gandhi | G06Q 10/087 705/28 |
| 2008/0301008 | A1* | 12/2008 | DePrisco | G06Q 10/06 705/28 |
| 2009/0138385 | A1* | 5/2009 | Harnish | G06Q 10/087 705/28 |
| 2009/0138872 | A1* | 5/2009 | Fuchs | G06F 8/61 717/173 |
| 2009/0234517 | A1* | 9/2009 | Feuillebois | G06Q 50/28 701/3 |
| 2010/0087983 | A1* | 4/2010 | Boss | G06Q 10/20 701/31.4 |
| 2011/0279283 | A1* | 11/2011 | Corn | G06Q 10/06 340/686.6 |
| 2011/0288954 | A1* | 11/2011 | Bertosa | G07C 5/008 705/26.9 |
| 2012/0150380 | A1* | 6/2012 | Whittaker | G07C 5/006 701/29.4 |
| 2013/0335197 | A1 | 12/2013 | Oder et al. | |
| 2014/0061382 | A1* | 3/2014 | Tucker | G07C 5/008 244/1 R |
| 2014/0312112 | A1* | 10/2014 | Floyd | G06F 17/30002 235/375 |
| 2016/0314328 | A1 | 10/2016 | Hosamane et al. | |
| 2018/0293810 | A1 | 10/2018 | Griffith et al. | |

OTHER PUBLICATIONS

European Search Report Issued in European Application No. 19214776.7 dated Feb. 18, 2020; 9 Pages.

* cited by examiner

ELECTRONIC LABEL SYSTEM

BACKGROUND

In general, an aircraft can employ a distribution assembly that supports a plurality of cards that manage features, functions, and components of the aircraft. When the aircraft is powered up (and power is in turn supplied to the distribution assembly), the aircraft communicates with the distribution assembly to perform a system check. The system check confirms that each card is operating correctly, that a correct software version is installed per card, that a correct part number is associated therewith, that connected components communicate correctly with each card, etc. Thus, the system check is required to identify what is present and working in the distribution assembly.

When a concern and/or an error is found by the system check, a technician can perform aircraft and distribution assembly maintenance. First, the aircraft is powered down. Then, the technician generally utilizes a paper report (e.g., printed at the conclusion of the system check in a maintenance shop) to physically check the distribution assembly, replace any cards, repair any connection, etc. More particularly, because the distribution assembly (and cables attached thereto) are usually identified with traditional adhesive labels, the technician utilizes the printed paper report in conjunction with the traditional adhesive labels to perform the aircraft and distribution assembly maintenance. Then, once the maintenance is complete, the aircraft is powered up, and the system check is performed again (hopefully without concern/error).

Traditional adhesive labels can be difficult to read, given label space and text size, and/or re-label, as the text cannot be changed or added to. In some cases, it has been found that multiple adhesive labels are used on the distribution assembly and cables attached thereto with respect to multiple maintenance instances. Traditional adhesive labels also fail to identify any wireless connections to the distribution assembly.

SUMMARY

According to one or more embodiments, an electronic label system is provided. The electronic label system includes a line replaceable unit. The electronic label system also includes an electronic label communicatively coupled to the line replaceable unit via a hardware link. The electronic label stores information respective to the line replaceable unit. The electronic label includes a chip or a radio frequency identification tag that provides the information to a reader.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Figure 1:
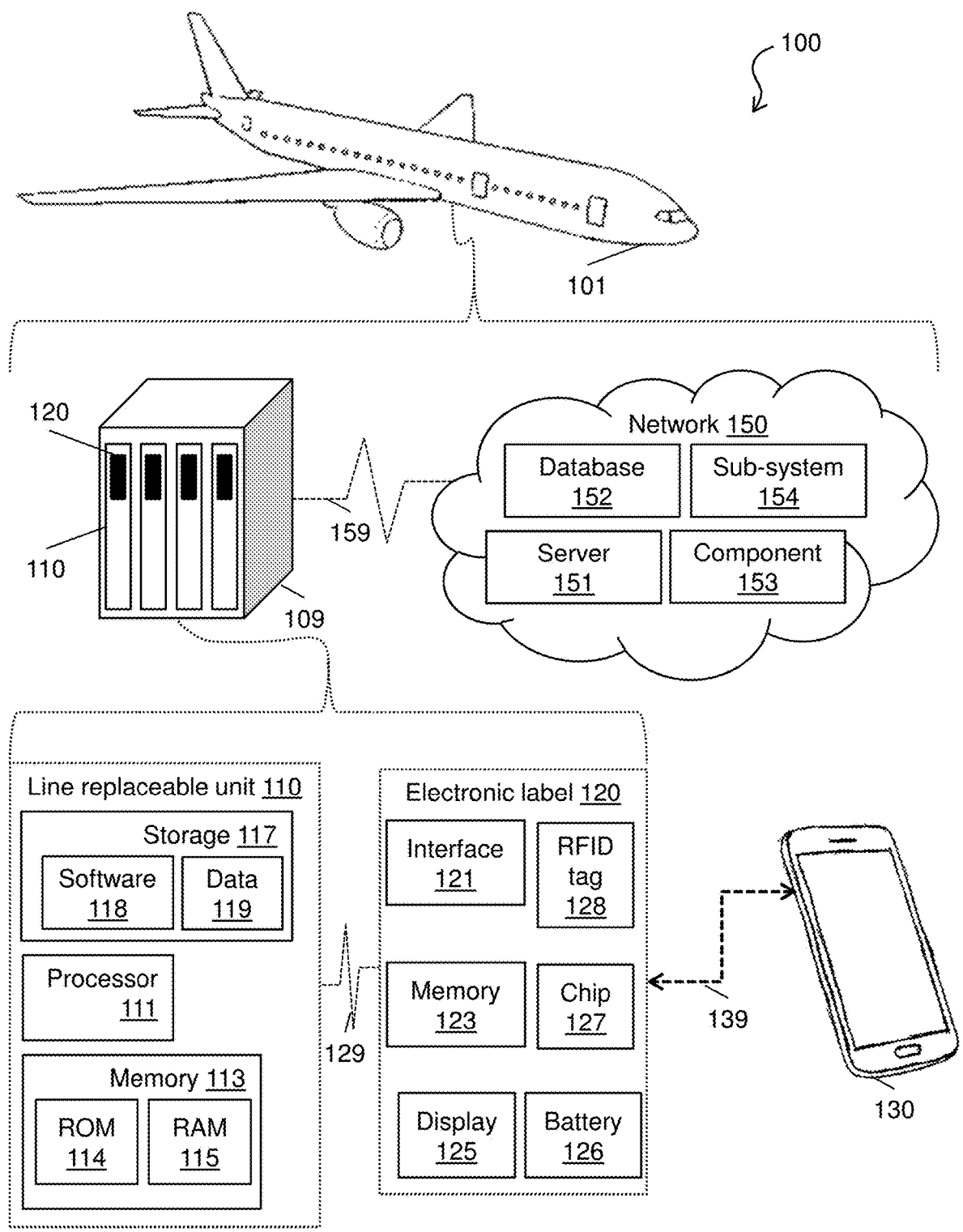
FIG. 1 depicts a system in accordance with one or more embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, as discussed above, traditional adhesive labels can be difficult to read, given label space and text size, and/or re-label, as the text cannot be changed or added to. In some cases, it has been found that multiple adhesive labels are used on the distribution assembly and cables attached thereto with respect to multiple maintenance instances. Traditional adhesive labels also fail to identify any wireless connections to the distribution assembly. Further, while the distribution assembly is powered off, there is no mechanism for acquiring health data and communication troubleshooting is difficult in real time.

Turning now to an overview of the aspects of the invention, one or more embodiments of the invention address the above-described shortcomings of the prior art by providing an electronic label with a communication link to a line replaceable unit in a chassis. The electronic label provides information both electronically (and optionally visually) to maintenance personnel. The information is sourced from the line replaceable unit (e.g., a processor therein) through the communication link when the line replaceable unit is powered on. Further, the information is available through the electronic label when the line replaceable unit is powered off. The information can be static or dynamic, sourced in real-time or at predetermined intervals, and can include one or more of, but not limited to, critical failure data and history data, fault data and history data, health data and history data, wiring data, manufacturing data, wired or wireless connection data, usage history data, software version data (e.g., current software version and history), current hardware modifications and history data, repair history data, and uptime data with respect to the line replaceable unit, chassis, and components connected thereto.

Embodiments of the electronic label disclosed herein can be implemented in a system, method, and/or computer program product (generally referred to as an electronic label system herein). Embodiments of the electronic label system are necessarily rooted in processors therein to perform proactive operations to overcome problems specifically arising in the realm of traditional adhesive labels. For instance, the communication link between the electronic label and the line replaceable unit enables updating of data in the electronic label in real-time, whereas the traditional adhesive labels have static data. Technical effects and benefits of the electronic label system (add the technical benefits as described above) include enabling a maintenance personnel to easily access information via the electronic label. For example, using the electronic label system in an aircraft, maintenance personnel can quickly access the electronic label and information thereon, can quickly identify whether the network connections are correct, can quickly check health data via the electronic label to proceed with replacement, and can retrieve information without the aircraft being power on.

Turning now to FIG. 1, an electronic label system 100 for implementing the teachings herein is shown in according to one or more embodiments of the invention. By way of example only, the electronic label system 100 is embodied on an aircraft 101. The electronic label system 100 can be an electronic, computer framework comprising and/or employing any number and combination of computing device and networks utilizing various communication technologies, as described herein. The electronic label system 100 can be easily scalable, extensible, and modular, with the ability to change to different services or reconfigure some features independently of others.

The electronic label system 100 includes a chassis 109. The chassis 109 is a computer system unit housing/enclosing computer hardware components, such as a backplane. The chassis 109 is capable of receiving sand supporting one or more line replaceable units (e.g., a line replaceable unit 110).

The line replaceable unit 110 is a modular component (e.g., of the aircraft 101) that is designed to be replaced quickly at an operating location. In general, the line replaceable unite 110 includes a processor 111, which can include one or more central processing units (CPUs). The processor 111, also referred to as a processing circuit, microprocessor, computing unit, is coupled via a system bus to a memory 113 and various other components. The memory 113 includes read only memory (ROM) 114 and random access memory (RAM) 115. The ROM 114 is coupled to the system bus and may include a basic input/output system (BIOS), which controls certain basic functions of the electronic label system 100. The RAM 115 is read-write memory coupled to the system bus for use by the processor 111.

The line replaceable unit 110 of FIG. 1 includes storage 117, which is an example of a tangible storage medium readable executable by the processor 111. The storage 117 stores software 118 and data 119. The software 118 is stored as instructions for execution on the electronic label system 100 by the processor 111 (to perform process, such as the process flows of FIGS. 2-3). The software 118 can be stored as different versions. The data 119 includes a set of values of qualitative or quantitative variables organized in various data structures to support and be used by operations of the software 118. Example of the data 119 can include information as described herein (e.g., critical failure data and history, fault data and history, health data and history, wiring data, manufacturing data, wired or wireless connection data, usage history, current software version and history, current hardware modifications and history, repair history, and uptime data).

The line replaceable unit 110 of FIG. 1 also includes an electronic label 120. The electronic label 120 can include one or more of an interface 121, a memory 123, a display 125, a battery 126, a chip 127, and a radio frequency identification (RFID) tag 128. The electronic label 120 can be mounted physically on a face of the line replaceable unit 110.

The interface 121 interconnects and supports communications (e.g., communicatively couples via communication link 129) between the line replaceable unit 110 and other components of the electronic label system 100 (e.g., peripheral and external devices). Note the communications can be provided via a hardware link (e.g., a serial link between the interface 121 and the processor 111 that is internal to the chassis 109). The memory 123 is an example of a tangible storage medium readable via the chip 127 and/or the RFID tag 128. The display 125 can include visual interface and a graphics controller to provide a text or graphics user interface. The battery 126 is a device consisting of one or more electrochemical cells with external connections provided to the electronic label 120.

The chip 127 can be an integrated circuit. The RFID tag 128 is an electronic device that utilizes electromagnetic fields to automatically identify objects that it is attached thereto. The chip 127 and the RFID tag 128 can be mounted physically on a face or within the electronic label 120. The chip 127 and the RFID tag 128 can be contact or contactless interfaces that are engaged by a reader 130. The electronic label 120 can utilize the battery 126 or collect energy from interrogating radio waves of the reader 130. The reader 130 can be any electronic label reader device, such as a handheld reader or a smart phone with a label read application, which communicates 139 with the electronic label 120 to procure information stored in the memory 123.

In addition, the electronic label system 100 can include a network 150 enabling the electronic label system 100 to communicate with other systems, devices, data, and software of the aircraft 101, such as a server 151, a database 152, a component 153, and a sub-systems 154 (via connection 159).

Thus, as configured in FIG. 1, the operations of the software 118, the data 119, and the electronic label 120 (e.g., the electronic label system 100) are necessarily rooted in the computational ability of the processor 111, the chip 127, and/or the RFID tag 128 to overcome and address the herein-described shortcomings of the conventional machine translation GUIs. In this regard, the software 118, the data 119, and the electronic label 120 improve computational operations of the electronic label system 100 by providing the technical effects and benefits described herein. Operations of the electronic label system 100 is now described with respect to FIGS. 2-3.

Figure 2:
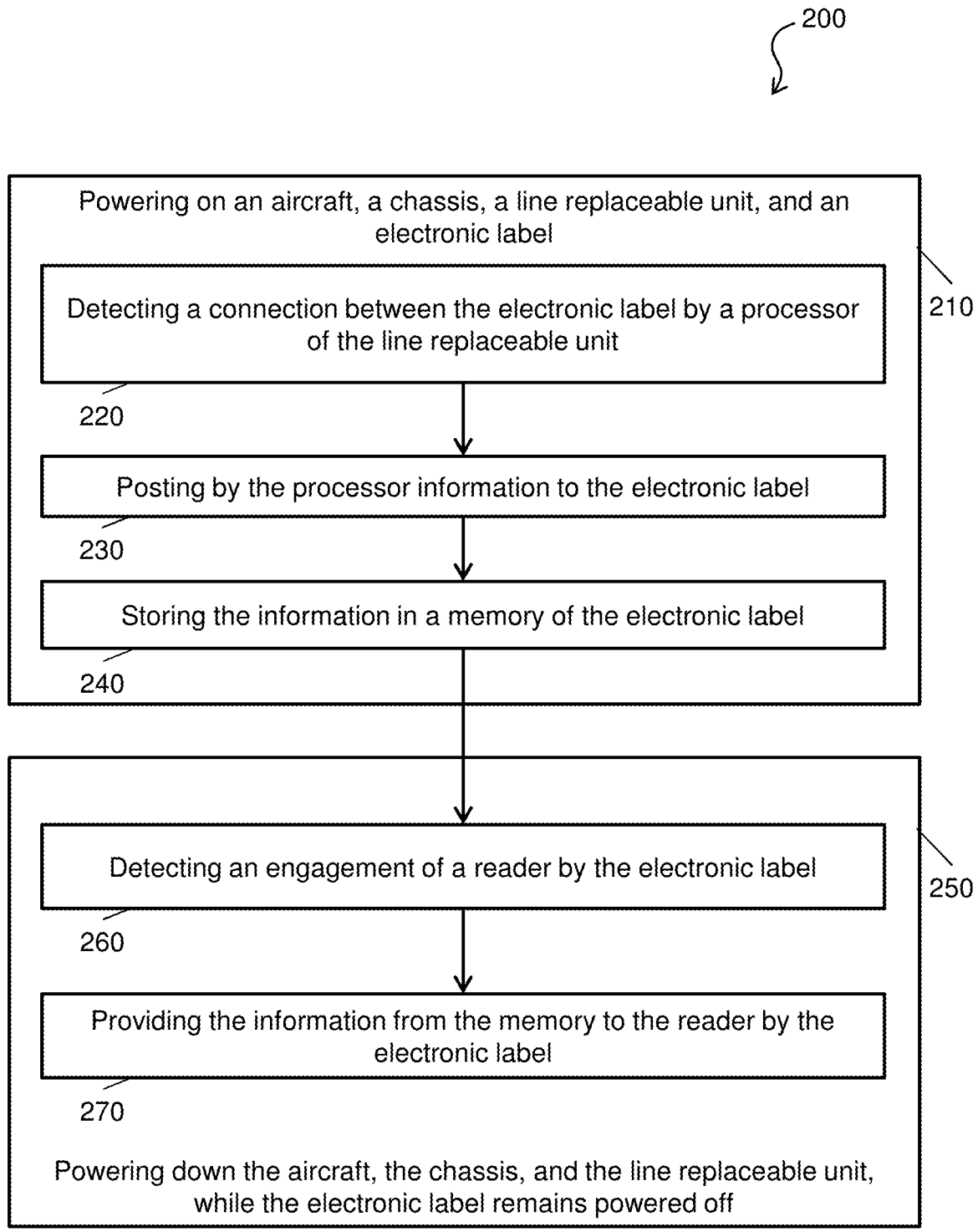
FIG. 2 depicts a process flow in accordance with one or more embodiments.

FIG. 2 depicts a process flow 200 in accordance with one or more embodiments. The process flow 200 begins at block 210, where the aircraft 101, the chassis 109, the line replaceable unit 110, and the electronic label 120 are powered on. In this regard, the aircraft 101 is turn on for operation or maintenance. In the either case, the chassis 109 and the line replaceable unit 110 run through a system check. If the system check is valid, then the aircraft 101 can be approved to fly. In the system check is invalid, information (e.g., failure and fault data) can be sent to the memory 113 of the line replaceable unit 110. Note that, in the case of multiple line replaceable units 110, each corresponding memory 113 can store information resulting from the system check (e.g., each line replaceable unit 110 provides power to the corresponding electronic label 120 while posting the information to the memory 113). For instance, during the system check, the processor 111 of the line replaceable unit 110 detects a communication link 129 between the electronic label 120 and the line replaceable unit 110, as shown in block 220. Further, at block 230, the processor 111 posts information to the electronic label 120. At block 240, the electronic label 120 stores the information in the memory 123. Once stored, the electronic label 120 can present/display the information for optical viewing via the display 125.

The process flow 200 then proceeds to block 250, where the aircraft 101, the chassis 109, and the line replaceable unit 110 are powered off, while the electronic label 120 remains powered on (e.g., via the battery 126 or via the reader 130). For instance, at block 260, the electronic label 120 detects an engagement of the reader 130. Further, at block 270, the electronic label 120 provides the information from the memory 123 to the reader 130.

Figure 3:
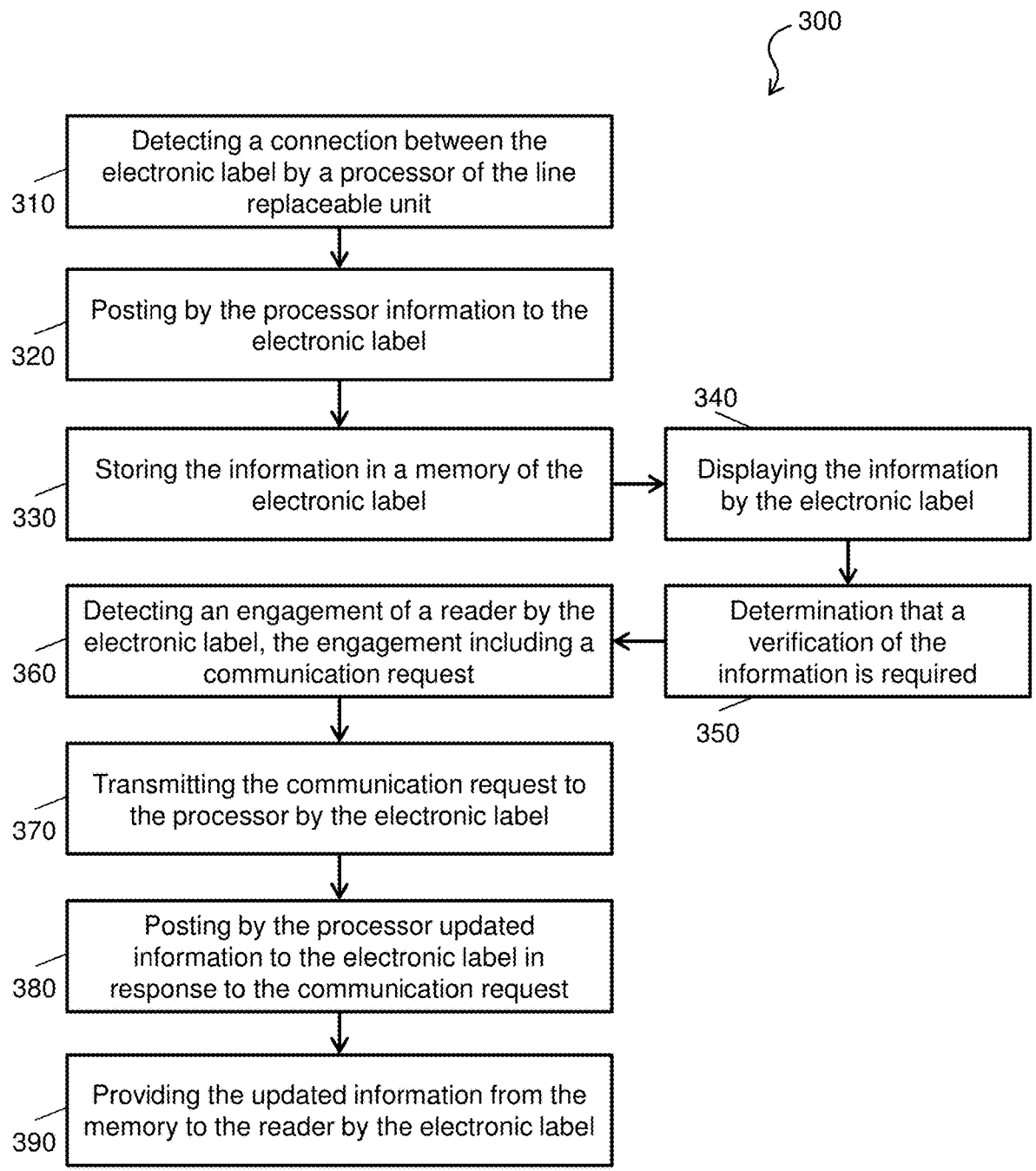
FIG. 3 depicts a process flow in accordance with one or more embodiments.

FIG. 3 depicts a process flow 300 in accordance with one or more embodiments. The process flow 300 begins at block 310, where the processor 111 of the line replaceable unit 110 detects a communication link 129 between the electronic label 120 and the line replaceable unit 110. At block 320, the processor 111 posts information to the electronic label 120. At block 330, the electronic label 120 the electronic label 120 stores the information in the memory 123. At block 340, the electronic label 120 presents/displays the information (e.g., for optical viewing via the display 125). In accordance with one or more embodiments, the process flow 300 can take an alternate or parallel path to block 340 when the maintenance personnel engages the electronic label 120 via the reader 130 (such as when the electronic label 120 does not include the display 125).

At this stage in the process, maintenance personnel can check the chassis 109 and components therein. Thus, at block 350, maintenance personnel makes a determination that a verification of the information is required. In this regard, the maintenance personnel may determine that the information visually displayed is out of date, incorrect, or is not the most recent version. In this regard, the maintenance personnel utilizes to the reader 130 to perform the information verification and the process flow proceeds to block 360. In accordance with one or more embodiments, the maintenance personnel can decide that additional information not displayed or provided to the reader 130 is needed and requests additional information not normally stored in the memory 123. That is, the maintenance personnel can interface with the reader 130 to cause the reader to generate the request and the type of additional information (e.g., a timestamp of a last time a maintenance personnel requested an update).

At block 360, the electronic label 120 detects an engagement of the reader 130. The engagement can include a communication request, which embodies the information verification directed by the maintenance personnel. At block 370, the electronic label 120 transits the communication request to the processor 111. At block 380, the processor 111 posts updated information to the electronic label 120 in response to the communication request. At block 390, the electronic label 120 provides the updated information from the memory 123 to the reader 130.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An electronic label system comprising:
   a line replaceable unit including a processor;
   an electronic label communicatively coupled to the line replaceable unit via a hardware link, the electronic label storing information respective to the line replaceable unit, the electronic label comprising a chip or a radio frequency identification tag that provides the information to a reader; and
   a display installed on the electronic label,
   wherein the processor performs a system check that determines results including operation status of the line replaceable unit, a current software version installed on the line replaceable unit, and a communication status between components installed on the line replaceable unit, and
   wherein the display displays at least one of the results.

2. The electronic label system of claim 1, wherein the line replaceable unit provides power to the electronic label while posting the information to a memory of the electronic label.

3. The electronic label system of claim 1, wherein the information is available through the electronic label when the line replaceable unit is powered off.

4. The electronic label system of claim 1, wherein the information includes one or more of manufacturing data, software version data, current hardware modifications and history data, and critical failure and history data.

5. The electronic label system of claim 1, wherein the line replaceable unit detects a connection through the hardware link to the electronic label and posts information to the electronic label based on the results from the system check.

6. The electronic label system of claim 1, wherein the electronic label is mounted physically on a face of the line replaceable unit.

7. The electronic label system of claim 1, wherein the electronic label further comprises:
   a chassis of an aircraft, the chassis housing the line replaceable unit and receiving power form the aircraft.

8. The electronic label system of claim 1, wherein the electronic label receives a request for additional information from the reader.

9. An electronic labelling method comprising:
   powering a line replaceable unit and an electronic label, the electronic label being communicatively coupled to the line replaceable unit via a hardware link;
   posting information to an electronic label while the line replaceable unit is powered on, the information being respective to the line replaceable unit;
   performing, by a processor included with the electronic label, a system check that determines results including operation status of the line replaceable unit, a current software version installed on the line replaceable unit, and a communication status between components installed on the line replaceable unit;
   storing the information and the results by the electronic label; and
   providing, via a chip or a radio frequency identification tag of the electronic label, the information to a reader; and
   displaying at least one of the results on a display installed on the electronic label.

10. The electronic labelling method of claim 9, wherein the line replaceable unit provides power to the electronic label while posting the information to a memory of the electronic label.

11. The electronic labelling method of claim 9, wherein the information is available through the electronic label when the line replaceable unit is powered off.

12. The electronic labelling method of claim 9, wherein the information includes one or more of manufacturing data, software version data, current hardware modifications and history data, and critical failure and history data.

13. The electronic labelling method of claim 9, wherein the line replaceable unit detects a connection through the hardware link to the electronic label and posts information to the electronic label based on the results from the system check.

14. The electronic labelling method of claim 9, wherein the electronic label is mounted physically on a face of the line replaceable unit.

15. The electronic labelling method of claim 9, wherein a chassis of an aircraft houses the line replaceable unit and receiving power form the aircraft.

16. The electronic labelling method of claim 9, wherein the electronic label receives a request for additional information from the reader.

* * * * *